United States Patent [19]

Kawasaki et al.

[11] 4,041,506
[45] Aug. 9, 1977

[54] TIMING CIRCUITS FOR CAMERA SHUTTERS

[75] Inventors: Masahiro Kawasaki; Hirokazu Ando, both of Tokyo, Japan

[73] Assignee: Asahi Kogaku Kogyo Kabushiki Kaisha, Japan

[21] Appl. No.: 599,005

[22] Filed: July 25, 1975

[30] Foreign Application Priority Data

July 27, 1974   Japan .................................. 49-89965

[51] Int. Cl.² ............................................... G03B 7/08
[52] U.S. Cl. .................................................... 354/51
[58] Field of Search .......................... 354/50, 51, 60 R

[56] References Cited

U.S. PATENT DOCUMENTS

| 3,712,194 | 1/1973 | Yoshimura .......................... 354/51 X |
| 3,849,786 | 11/1974 | Nanka et al. ............................ 354/51 |
| 3,863,263 | 1/1975 | Itagalci ............................. 354/51 X |
| 3,864,701 | 2/1975 | Krause ................................ 354/51 X |
| 3,879,740 | 4/1975 | Mori et al. .......................... 354/51 X |
| 3,936,843 | 2/1976 | Kurei et al. ............................ 354/51 |

Primary Examiner—Donald A. Griffin

[57] ABSTRACT

A memory capacitor in an electric shutter circuit has one terminal coupled to a voltage responsive element such as a diode, which operates to effectively reduce the level to which the capacitor is charged to thereby attain a decrease in discharge time of the capacitor enabling rapid shutter operation.

10 Claims, 6 Drawing Figures

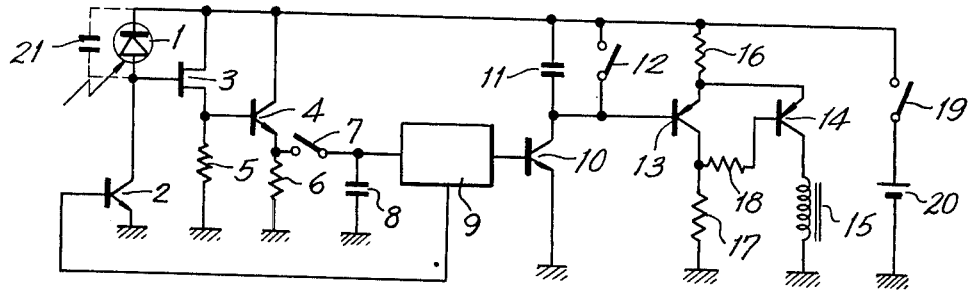
Fig-1 PRIOR ART
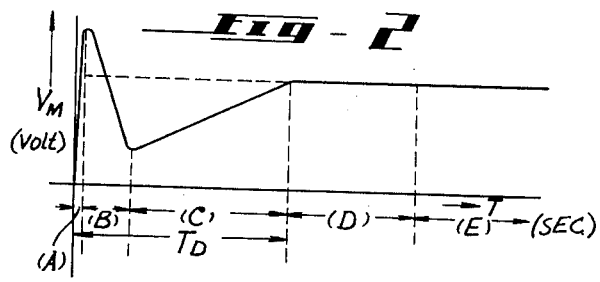
Fig-2
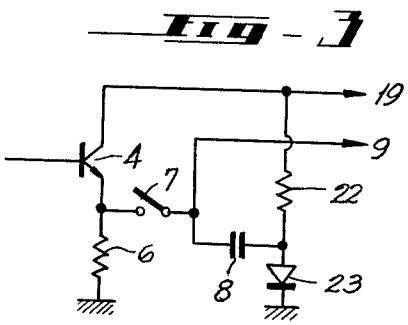
Fig-3
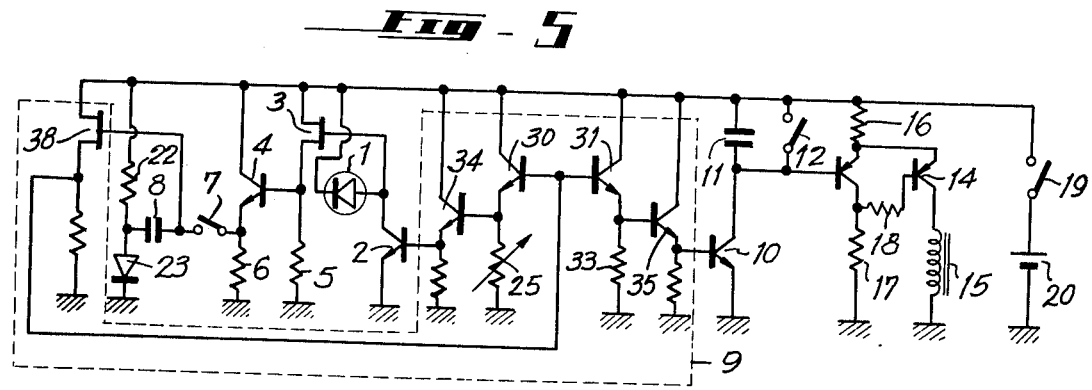
Fig-5
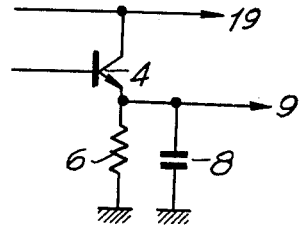
Fig-4-A PRIOR ART
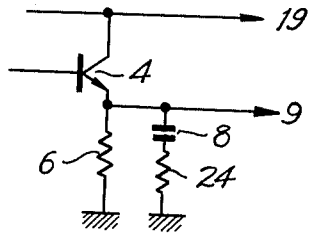
Fig-4-B

TIMING CIRCUITS FOR CAMERA SHUTTERS

BACKGROUND OF INVENTION

This invention relates to cameras and more particularly to improve circuitry for use with electrically operated shutters in cameras.

Many cameras exist which employ electrically controlled shutters to determine automatically from factors including the brightness of a scene to be photographed the exposure time of the film by controlling the interval during which the shutter remains open.

Typically, a storage device is used in such systems to "memorize" the subject or scene brightness and to provide an electrical signal according to or determined by the subject or scene brightness. Such systems employ a capacitor to store a charge according to the brightness. These capacitors, due to normal operating conditions, are relatively large and hence are associated with large charging and discharging time constants. These large constants affect the response speed of the associated shutter and hence, the operating characteristics of the camera.

SUMMARY OF THE INVENTION

It is therefore an object of the present invention to provide an improved shutter control circuitry operative to rapidly charge and discharge a memory capacitor while assuring reliable and improved shutter operation.

In particular, it is an object of the invention to provide simple inexpensive circuitry capable of being connected to the memory capacitor for reducing delays normally encountered with conventional memory capacitors.

According to the invention, an electric shutter-operating circuit, for use in a camera of the type employing a light receiving element which provides a current corresponding to the light received by the camera from a scene, includes a memory capacitor which is charged according to this current and in combination therewith apparatus for controlling the discharge time of the capacitor and comprising a voltage responsive means connected in series with the capacitor and operative to alter the rate at which the above current charges the capacitor according to the light received.

BRIEF DESCRIPTION OF DRAWINGS

The invention is illustrated by way of example in the accompanying drawings which form part of this application and in which:

FIG. 1 is schematic diagram partially in block form of a typical prior art shutter circuit;

FIG. 2 is a graph depicting the charge versus time characteristics of a capacitor used in the circuit;

FIG. 3 is a schematic diagram of a charging circuit according to this invention;

FIG. 4A is a schematic circuit diagram of a prior art charging circuit.

FIG. 4B is an alternate embodiment of a charging circuit according to this invention; and FIG. 5 is a detailed schematic diagram of a circuit according to this invention.

DESCRIPTION OF PREFERRED EMBODIMENTS

Referring to FIG. 1, there is shown a conventional electric shutter circuit typical of the employed in the prior art.

A light receiving element such as photodiode 1 is arranged so that light reflected from the subject impinges on the p-n junction associated with such devices. The light thus impinging on the diode 1 may first be directed through the objective lens of the camera and then reflected to the view finder of a single lens reflex camera before reaching diode 1.

The diode 1 may be a photoconductive or a photovoltaic photodiode. In the photoconductive diode a reverse bias is applied, and in the photovoltaic diode no bias is applied.

The anode of the diode 1 is typically connected to the collector electrode of a grounded emitter transmitter 2, and the cathode of the diode 1 is coupled to a source of operating potential 20 via a power switch 19. The transistor 2, thus having a photodiode 1 as a collector load, operates to provide a logarithmic compressed output. It is also known to provide such logarithmic circuits both for compression and expansion of signals applied thereto.

The collector output of transistor 2 is coupled to the gate electrode of FET (field effect transistor) 3. The source electrode of the FET 3 is coupled to reference potential via a resistor 5, and the drain electrode is directly connected to the source of operating potential 20 via the switch 19. The FET 3 is thus arranged in a source follower configuration and as such possesses a high input impedance so as not to unduly load the photodiode 1 or the transistor 2.

An emitter follower transistor 4 has an emitter load resistor 6 and has its base electrode coupled to the source electrode of the FET 3. The combination of the FET source follower and the emitter follower provide a buffer amplifier having a large input impedance and a low output impedance. The low output impedance at the emitter of transistor 4 is used to charge a memory capacitor 8 via a switch 7. Thus, the emitter electrode of transistor 4 is coupled to the memory capacitor 8 via the switch 7.

The capacitor 8 is also coupled to a signal operation circuit 9 shown in block form. The circuit 9 conventionally determines an electric quantity, such as a voltage or current, according to the light emanating from the subject or scene, the sensitivity of the film used in the camera and the particular diaphragm value.

A lead from the operation circuit 9 is also coupled to the base electrode of the transistor 2 to provide a feedback loop. The feedback loop, as will be explained, controls the base current of transistor 2 according to the received light and hence, current of the photodiode 1.

An output terminal of the signal operation circuit 9 is connected to the base electrode of a transistor 10 having a grounded emitter. Transistor 10 is connected to a timing capacitor 11 as a collector load. Capacitor 11 has one terminal connected through the power switch 19 to source 20.

The transistor 10 functions to logarithmically expand the output signal. A timing switch 12 is in shunt with the capacitor 11 and is opened in a known way in synchronism with opening of the shutter.

An electromagnet 15 for terminating the exposure by releasing the trailing shutter curtain, is coupled between the collector electrode and ground of a switching transistor 14, which is controlled by a transistor 13. The base electrode of transistor 14 is coupled via a resistor 18 to the collector electrode of transistor 13. Transistor 13 is arranged in a common collector configuration having a collector load resistor 17 and an emitter load resistor 16. Resistor 16 is coupled to the switchable source of potential 20 and serves to bias both transistors 13 and 14.

The base electrode of transistor 13 is coupled to the collector electrode of transistor 10.

Also shown in dash lines at the upper left of FIG. 1 is a capacitor 21 shunting the photodiode 1. The capacitor 21 is the junction capacitor of the photodiode 1 and, for a typical device, may be of an order of magnitude of several hundred picofarads. It is understood, however, that the junction capacity may vary depending upon the diode 1 employed.

FIG. 2 is a graph useful in explaining the operation of the circuit. The ordinate depicts the voltage variation across the memory capacitor 8, according to the abscissa, which is indicative of time T. The transitions depicted by time durations A, B, C, D & E are determined by switch operation such as the closure of the power switch 19.

TIME PERIOD A

Assume that the switch 19 is open and further assume that the diode 1 is a self-biased type biased forwardly when receiving a given amount of light. As such, as long as light is impinging on the diode 1, the junction capacitor 21 is charged. Transistor 2 is non-conducting. As soon as an operator depresses the shutter release switch, the power switch 19 and the memory switch 7 are activated and close.

The closure of the power switch 19 causes transistors 13 and 14 to conduct and hence the electromagnet 15 is energized. Operation of the electromagnet 15 serves to retain the trailing curtain of the shutter and hence prevents shutter closure.

As indicated, the photodiode capacitor 21 is charged and the FET 3 is forward biased and hence, is conducting current via the drain to source path. The current from the FET 3 flows until the junction capacitor 21 is discharged via the gate to source path of the FET 3. The saturated current from the FET is split between the source resistor 5 and the base to emitter path of transistor 4. Through transistor 4, having a low output impedance, FET 3 serves to rapidly charge capacitor 8 (usually within a period of several milliseconds). Capacitor 8 charges to a voltage relatively equal to the voltage of the source 20 minus the source to drain saturation voltage of FET 3 minus the base to emitter voltage of transistor 4.

TIME PERIOD B

Assume that the operation unit 9 has such a rapid response that the charging time constant of capacitor 8 can be neglected and also assume that the transmission characteristic of circuit 9 between its input and output terminals is linear. Accordingly, the base voltage of transistor 2 is raised with an increase in the potential difference across the terminals of the memory capacitor 8.

As soon as the base current of transistor 2 increases the collector current increases thus discharging the junction capacitor 21. The voltage at the collector of transistor 2 falls rapidly due to the feedback loop. This, therefore, lowers the voltage on the gate of the FET 3 and the base of the transistor 4.

However, the voltage across capacitor 8 cannot follow the decrease in collector voltage of transistor 2 and hence, the emitter electrode of transistor 4 becomes more positive than the base electrode and transistor 4 ceases conduction. Since the capacitor 21 is discharging through the FET, the non-conduction of transistor 4 affects the charge stored on the memory capacitor.

Assume now that the junction capacitor 21 completed discharging before operation of the switch 19. In this condition, the diode 1 is reversed biased and develops a current which flows via the collector to emitter path of transistor 2. This collector current is usually quite small (especially for low brightness scenes) and does not reach a level high enough to follow the base electrode of transistor 2. Transistor 2 is thus saturated and biases transistor 4 off, allowing the memory capacitor 8 to discharge via resistor 6.

The discharge of capacitor 8 causes transistor 4 to turn on also aided by the feedback to the base of transistor 2. When transistor 4 comes on, the voltage across the capacitor 8 is reduced. At this point, the junction capacitor 21 is charged almost to the level of the source 20. The transistor 4 is thus cut-off until the collector voltage of transistor 2 or the gate voltage of the FET 3 is returned to a quiescent state. In any event, the memory capacitor 8 cannot discharge fully and hence, as shown in FIG. 2, returns to a predetermined level below a normal level.

TIME PERIOD C

As soon as the voltage across capacitor 8 decreases sufficiently (end of period B), transistor 4 starts to conduct to enable the recharging of the capacitor 8 to its normal level. The charge across capacitor 8 at its normal level is controlled by the transistor 2 and the diode 1, being determined by the light impinging on the diode 1.

TIME PERIOD D

The capacitor 8 thus recharges within the time $T_D$ (at the end of period C) to a level determined by the photocurrent via the diode 1 and hence, reaches a steady level during the period D, as shown in FIG. 2. In this way capacitor 8 is made ready for the next memory operation.

TIME PERIOD E

The release of the shutter in a known way opens the switch 7 and the switch 12, and the capacitor 8 has stored thereacross, the voltage as determined by the scene light. This voltage is applied through circuit 9 to the base electrode of transistor 10. Transistor 10 and the collector capacitor 11 then determine the time constant necessary for releasing the trailing curtain to close the shutter. Capacitor 11 is thus charged according to the base voltage on transistor 10 and hence, its collector voltage is decreased until transistor 13 is biased off, thus turning off transistor 14 and hence, releasing the electromagnet 15 to thereby finalize the shutter closure.

In the above circuit, due to the charging rate of capacitor 8, the transistor 4 will become non-conductive and hence, prevent the full discharge of the capacitor 8, thus creating undue circuit delay and unreliable operation.

If reference is made to FIG. 3, there is shown an improved circuit for controlling the charge across the memory capacitor 8. An equivalent diagram is shown in FIG. 4-B.

The circuit of FIG. 3 utilizes the source follower 4 having its base electrode connected to the source electrode of an FET 3 as in FIG. 1. The emitter electrode is again coupled via a switch 7 to the memory capacitor 8.

However, the other terminal of the memory capacitor is not returned to ground, but is connected to a terminal of a voltage divider comprising a resistor 22 in series with a diode 23. The resistor 22 has one terminal coupled to the switched power source 20 and the other terminal coupled to the anode of the diode 23 having its cathode connected to a point of reference potential or ground. The junction between the resistor 22 and the anode of diode 23 is connected to the other terminal, as above indicated, of the memory capacitor 8.

The output from the memory capacitor 8 is directed via the operation circuit 9 to the base electrode of the transistor 10.

The addition of the voltage divider comprising resistor 22 and diode 23 serves to reduce the discharging time of the capacitor 8 and hence speed-up circuit operation. The charge across the capacitor 8 is given as in FIG. 1 by the following equation:

$$Q_{M1} = V_M C_M \left( 1 - \exp\left( -\frac{t}{r_0 C_M} \right) \right)$$

where
$Q_{M1}$ = charge across capacitor 8
$V_M$ = voltage at emitter of transistor 4
$C_M$ = capacitance of capacitor 8
$t$ = time
$r_0$ = output impedance of the emitter follower 4 and resistor 6.

For the addition of the divider or the series resistance 24 of FIG. 4-B, the charge across the capacitor QM2 is as follows:

$$QM2 = V_M C_M \left( 1 - \exp\left( -\frac{t}{r_0 C_M + R_M C_M} \right) \right)$$

where
$R_M$ = value of resistor 24 or value of diode resistance.
If $r_0 << R_M$ then:
$Q_{M1} >> Q_{M2}$ and the
difference between these values will be increased as time $t$ is shortened.

It can be seen that the circuit shown in FIG. 4-A (without the series resistor) and the circuit shown in FIG. 4-B can have relatively the same discharging time constants for memory capacitor 8. Therefore, the duration of time period B will be shortened and hence, the duration of time perid C will be shortened for the circuit shown in FIGS. 3 and 4-B.

A source follower 38 has its gate electrode coupled to the memory capacitor 8 and its source electrode coupled to the common base input terminal of follower 30 and 31.

Thus, as can be seen, as the charge on capacitor 8 increases, the voltage at the source of the FET 38 increases. This, in turn, increases the voltage at the emitter of both transistors 34 and 35. The output of transistor 34 is determined by the setting of resistor 25 and hence, the control of the photodiode 1 current is determined by the setting of resistor 25 according to the above mentioned factors. Transistor 35 follows the photodiode current according to the voltage across capacitor 8 and hence, the amount of light reflected from the scene to determine the shutter interval.

What is claimed is:

1. In an electric shutter circuit for use in a camera of the type employing a light receiving element which generates a current corresponding to the light received by the camera from a scene, said circuit including a memory capacitor which is charged according to said current, buffer amplifier means connected between said light receiving element and capacitor and having a large input impedance and a low output impedance, said buffer amplifier means being connected with said capacitor for charging the latter with said low output impedance, and, for controlling the discharge time of said capacitor, voltage responsive means connected in series with said capacitor and operative to alter the rate at which said current charges said capacitor according to said light received, said voltage responsive means being directly coupled at least in part between said capacitor and a point of reference potential, forming the only means connecting said memory capacitor to said reference potential, for reducing the level to which said memory capacitor is charged to thereby attain a decrease in discharge time of the memory capacitor enabling rapid shutter operation.

2. In an electric shutter circuit for a camera of the type employing a light receiving element which is operative to provide a current according to a received quantity of light, said circuit including an active device for providing an output according to said light and a memory storage element coupled to said active device and adapted to store a charge corresponding to the light received, and, for reducing the level to which said storage element is charged, voltage responsive means having a first terminal coupled to said storage element and a second terminal connected to a point of reference potential to effectively increase the series resistance of said element when charging according to said current provided by said light receiving element, said active device including a buffer amplifier means having a large input impedance and a low output impedance forming said output of said active device and utilizing said low output impedance for charging said memory storage element, said voltage responsive means being directly coupled at said first and second terminals thereof respectively to said storage element and said point of reference potential, forming the only means connecting said storage element to said reference potential, for reducing the level to which the storage element is charged to thereby attain a decrease in discharge time of the storage element enabling rapid shutter operation.

3. The shutter circuit according to claim 2 wherein said storage element comprises a capacitor.

4. The shutter circuit according to claim 3 wherein said voltage responsive means comprises a resistor in a series path with said capacitor between said output of said active device and a point of reference potential.

5. The shutter circuit according to claim 3 wherein said voltage responsive means comprises a resistor having a first and a second terminal, with said first terminal adapted to be connected to a point of operating potential and a diode having anode and cathode electrodes, with one of said electrodes coupled to and forming a junction with said second terminal of said resistor and said other electrode coupled to a point of reference potential and means coupling said capacitor to said junction for providing a predetermined level to said capacitor prior to charging the same.

6. In an electric shutter circuit for use in a camera, a light receiving element operative to provide an output current corresponding to a light quantity received by said camera from a subject, a logarithmic amplifier having an output terminal and an input terminal, and having said element coupled in series with said output terminal to provide a load for said amplifier, a storage capacitor having a first and a second terminal, said first terminal coupled to said output terminal of said amplifier for receiving a charge proportional to said output current, a voltage responsibe means having a first terminal coupled to said second terminal of said capacitor and a second terminal coupled to a point of reference potential and operative to control the rate at which said capacitor is charged by said output current, and means coupled to said input terminal of said amplifier for controlling said output current according to a predetermined characteristic of said camera, said logarithmic amplifier including a buffer amplifier means having a large input impedance and a low output impedance, said low output impedance being utilized at said output terminal for charging said capacitor, said voltage responsive means being directly coupled between said second terminal of said capacitor and said point of reference potential, forming the only means connecting said storage capacitor to said reference potential, for reducing the level to which said storage capacitor is charged to thereby attain a decrease in discharge time of the storage capacitor enabling rapid shutter operation.

7. The circuit according to claim 6 wherein said voltage responsive means include a unilateral current conducting device.

8. The circuit according to claim 7 further including a resistor having a first terminal adapted to be coupled to a source of operating potential and a second terminal coupled to said unilateral current conducting device.

9. The circuit according to claim 6 wherein said light receiving element comprises a photodiode.

10. The circuit according to claim 6 wherein said voltage responsive means includes a resistor having a first terminal coupled to said second terminal of said capacitor and a second terminal of said resistor coupled to ground.

* * * * *